Nov. 30, 1937.  J. E. TORBERT, JR  2,100,416
SAFETY DEVICE FOR AIRCRAFT AND OTHER CONVEYANCES
Filed July 13, 1936    7 Sheets-Sheet 1

Inventor
J. E. Torbert, Jr.
By Lacey & Lacey, Attorneys

Nov. 30, 1937. J. E. TORBERT, JR 2,100,416
SAFETY DEVICE FOR AIRCRAFT AND OTHER CONVEYANCES
Filed July 13, 1936 7 Sheets-Sheet 3

Inventor
John E. Torbert, Jr.
By Lacey & Lacey, Attorneys

Nov. 30, 1937. J. E. TORBERT, JR 2,100,416
SAFETY DEVICE FOR AIRCRAFT AND OTHER CONVEYANCES
Filed July 13, 1936 7 Sheets-Sheet 4

Inventor
John E. Torbert, Jr.
By Lacey & Lacey, Attorneys

Nov. 30, 1937.   J. E. TORBERT, JR   2,100,416
SAFETY DEVICE FOR AIRCRAFT AND OTHER CONVEYANCES
Filed July 13, 1936   7 Sheets-Sheet 5

Inventor
John E. Torbert, Jr.

By Lacey & Lacey, Attorneys

Patented Nov. 30, 1937

2,100,416

UNITED STATES PATENT OFFICE 2,100,416

SAFETY DEVICE FOR AIRCRAFT AND OTHER CONVEYANCES

John E. Torbert, Jr., National City, Calif.

Application July 13, 1936, Serial No. 90,408

18 Claims. (Cl. 244—1)

This invention relates to a safety appliance for airplanes and one object of the invention is to provide a device which, in one embodiment of the invention, has means for cutting off current at the battery and short circuiting the magneto and thus prevent an airplane from being set on fire by crossed wires after a crash.

Another object of the invention is to so construct the device that ordinary jolts caused by landing will not effect operation of the device, whereas a severe jolt caused by a crash landing will operate the device to cut off flow of current at the battery and short circuit the magneto.

Another object of the invention is the provision of a device of this character so constructed that a jolt received by a severe crash will cause the device to operate regardless of the position of the plane when it strikes.

Another object of the invention is to so construct the device that it cannot be tampered with after it is installed as practically all of its mechanism is enclosed in a housing which must be taken apart in order to permit setting of the device.

Another object of the invention is to so construct the device that it cannot readily get out of order and fail to operate when an airplane crashes.

Another object of the invention is to so construct a modified embodiment thereof that it may serve as means for opening a container of fire extinguishing gas when an airplane crashes and thus provide additional means for eliminating a fire hazard.

The invention is illustrated in the accompanying drawings, wherein

Figure 2 is a view showing the device in side elevation with one side wall of the housing removed and the mechanism in a set position.

Figure 1:
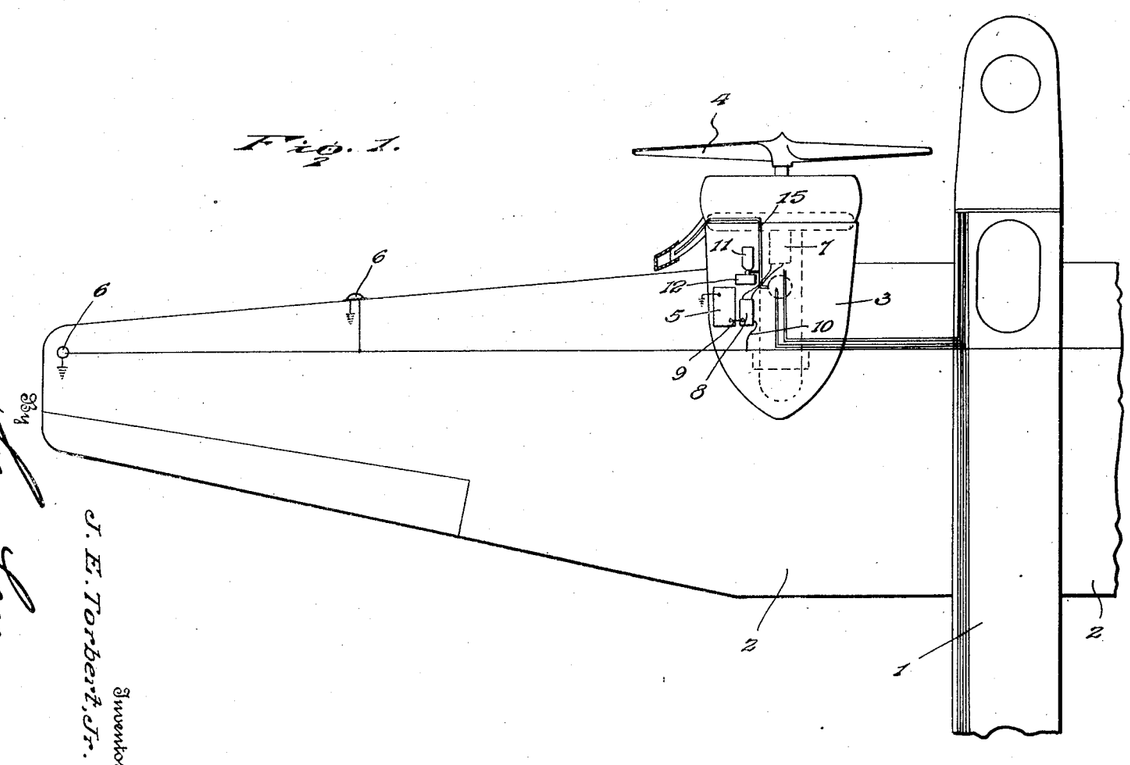
Figure 1 is a fragmentary semi-diagrammatic view showing a portion of an airplane and one motor thereof and showing the location of the two embodiments of the invention when in use.
Figures 3, 9:
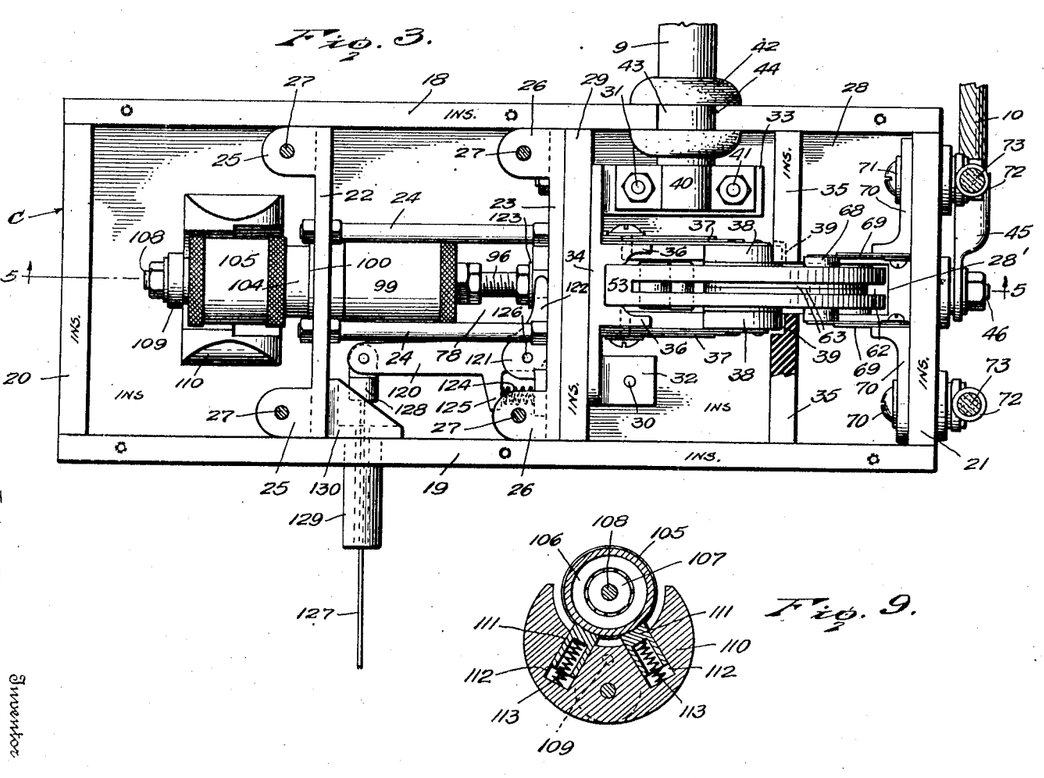
Figure 3 is a top plan view of the device with the upper wall of the casing removed, the view being taken along the line 3—3 of Figure 2.
Figure 9 is a sectional view through the weight forming part of the invention, the view being taken along the line 9—9 of Figure 5.

Referring to Figure 1 wherein there has been shown diagrammatically the fuselage 1 of an airplane and wings 2 projecting from opposite sides thereof, it will be seen that each of the wings carries a motor of a conventional construction which is indicated in general by the numeral 3 and operates a propeller 4. A battery 5 is provided for each motor which serves not only to supply current for the ignition system of the motor but also as means for supplying current to lights 6 upon the wings and other illuminating lights of the airplane. The usual magneto 7 is provided for the motor. The battery is mounted in any desired manner and the device 8 constituting the subject-matter of this invention and by means of which flow of current from the battery is to be cut off and the magneto short circuited, is mounted close to the battery and connected with the battery and the circuit for the ignition system and lighting system by conductors 9 and 10.

The container 11 in which fire extinguishing gas is stored is also mounted upon or near the motor and the device 12 constituting the second embodiment of the invention is mounted in operative relation to this container so that a sealing disc in the neck 14 of the container may be perforated and thus permit the fire extinguishing gas to flow through a pipe 15 to points about the motor where fire is liable to break out after a crash landing. The specific embodiment of the invention by means of which flow of current to the lighting and ignition circuit will be cut off and the magneto short circuited in case of a crash landing will be first described.

This embodiment of the invention is illustrated in Figures 2 through 10, and referring to these figures it will be seen that the mechanism is enclosed in a housing C formed of insulating material and having a bottom 16, a top 17, side walls 18 and 19 and end walls 20 and 21. Contacting marginal portions of these walls are detachably secured by screws or equivalent fasteners 21', any desired number of which may be used, and, therefore, the casing may be taken apart for inspection or testing the apparatus housed therein and for resetting the device after a crash. All of the mechanism except terminals to which wires are connected are enclosed in the housing or casing, as clearly shown in Figures 2 through 5 and, therefore, it cannot be tampered with. Within the housing or casing is mounted a frame having metal plates 22 and 23 which are held in spaced relation to each other by metal rods 24 and at their upper and lower ends are provided with lugs 25 and 26 through which screws or equivalent fasteners 27 pass to securely hold the frame in its proper position within the housing. By this arrangement, the frame will be securely held in its proper position and in its turn will constitute bracing means for the housing. A horizontally extending partition 28 which is formed of insulating material and slotted, as shown at 28', extends longitudinally in the housing between the plate 23 and the end wall 21. At its outer end, the partition is secured by a suitable number of screws which pass through the end wall 21 and its inner end portion abuts the plate 23 under a strip of insulating material 29 where it is secured by bolts 30 and 31 to the arms 32 and 33 of a metal bracket 34. This bracket 34 is secured against the strip of insulating material 29 and the insulating strip is, in its turn, secured against the plate 23. It will thus be seen that the partition 28 will be very firmly mounted between the plate 23 and the end wall 21 of the housing or casing and the bracket 34 is insulated from the plate 23. Blocks or strips 35 which extend transversely of the casing are carried by and extend upwardly from the partition 28 at opposite sides of the slot 28'. Between its arms 32 and 33, the bracket 34 carries other arms 36 which extend away from the bracket at opposite sides of the slot 28' and these arms carry springs 37 which project towards the block 35 and have their free ends secured to terminals 38, portions of which fit into notches or recesses 39 formed in the block 35. The terminals 38, the springs 37 and the bracket are all formed of conductive material and upon the arm 33 of the bracket rests a terminal socket 40 carried by the conductor 9 which leads to one terminal of the battery. This terminal 40 has side arms through which the bolt 31 and a bolt 41 pass so that the conductor will be securely but detachably connected with the arm of the bracket. A collar 42 formed of rubber fits about the insulating jacket of the conductor 9 and is grooved, as shown at 43, in order that this collar may be engaged in a semi-circular recess or passage 44 formed in the side wall 18 and securely hold the conductor in operative engagement with the housing. It will thus be seen that the conductor 9 may be permanently carried by the housing and its outer end clamped about the terminal of the battery when the device is in use.

The wire or conductor 10 by means of which current flows to the lighting system and ignition system is ordinarily connected with the battery terminal to which the conductor 9 is secured, but when this device is in use, the conductor 10 has its terminal 45 secured about the outer end 10 of a terminal pin or bolt 46 which extends through the end wall 21 and through the upstanding tongue 47 of a terminal bracket 48. This bracket is secured to the bottom or lower wall 16 of the housing by bolts 49 which not only serve as securing means for the bracket but also as terminal posts to which conductors 50 are secured. The conductors 50 are of the multiple braided type and extend upwardly from the terminal bolts 49 with their upper ends coiled about bushings or sleeves 51 which fit loosely about a rod 52 at opposite sides of a block 53 of insulating material. Each of the sleeves 51 is slotted, as shown at 54, so that the ends of the conductors 50 may be inserted into the slots of the sleeves and secured by solder or in any other desired manner which will firmly hold them to the sleeves. A large head 55 is provided at one end of the rod 52 in order that it may be grasped and the block 53 easily swung upwardly about the shaft 56 carried by brackets 57 which project from and are secured to the plate 23 by bolts 58 and screws 59. The other end of the rod 52 may carry a nut 60 to hold the rod in place or a cap nut corresponding to the head 55 and thus permit the rod to be grasped at both ends when swinging the block 53 upwardly. A hub or bushing 61 formed of metal fits tightly in an opening formed in the block 53 and is of such length that its end portions project from opposite sides of the block and contact with inner side faces of the brackets 57. The block of insulation is of semi-circular configuration and is formed with a slot or recess 62 which extends longitudinally of the arcuate edge face of the block. The pin or rod 52 extends through one end portion of the slot 62 and also through one end portion of a pair of conductor strips 63 which extend longitudinally in the recess 62 and fit snugly therein in face to face engagement with each other. It will be understood that a single conductor strip having a thickness corresponding to the two strips 63 may be used instead of the two strips if so desired. A pin 64 with its ends exposed at opposite side faces of the block of insulation and provided with heads 65 for engagement by the heads or terminals 38 carried by the springs 37 when the block is swung upwardly to the set position shown in Figures 2, 3, and 5. By this arrangement, the terminals 38 will be bridged when the insulating block is in the set position and current will be supplied to the distributer of the motor and the lighting circuit of the airplane. A second bridging pin 66 extends transversely through the insulating block at the upper end of the recess 62 in spaced relation to the upper ends of the conductor strips 63 and between the bridging pin 66 and the conductor strips 63 is a pin 67 formed of insulating material and serving to guide movement of the terminals 38 across the pins 64 and 66. The pin 66 is to serve as a bridge between the terminals 68 carried by the springs 69 of conductive material, and upon referring to Figure 3 it will be seen that the springs are carried by metal brackets 70 and rest upon the partition 28 at opposite sides of the slots 28' where they are secured against the end wall 21 by bolts 71 which extend through this end wall and serve not only as fasteners for the brackets 70 but also as posts for engagement by the terminals 72 of conductors 73 leading from the magneto. It will be readily understood that when the block 53 is released and moved from the position shown in Figures 2 and 5 about its pivot rod or shaft 56 to bring the pin 66 into position for engagement by the contacts 68, the magneto will be short circuited. Therefore danger of fire after a crash will be eliminated both by cutting off flow of current from the battery and by short circuiting the magneto. A web 74 having an arcuate lower edge extends downwardly from the top wall intermediate the width thereof and this web is of such length and thickness that it may fit between inner ends of the blocks 35 with its ends abutting the wall 21 and the face of the bracket 34 between the arms 36 of this bracket. By this arrangement, the portion of the web extending downwardly between the brackets 70 will serve as a barrier to prevent current from passing from one of these brackets to the other and the magneto cannot be short circuited except when the block 53 moves to a position in which the bridging pin 66 is engaged by the terminals 68.

Figure 5:
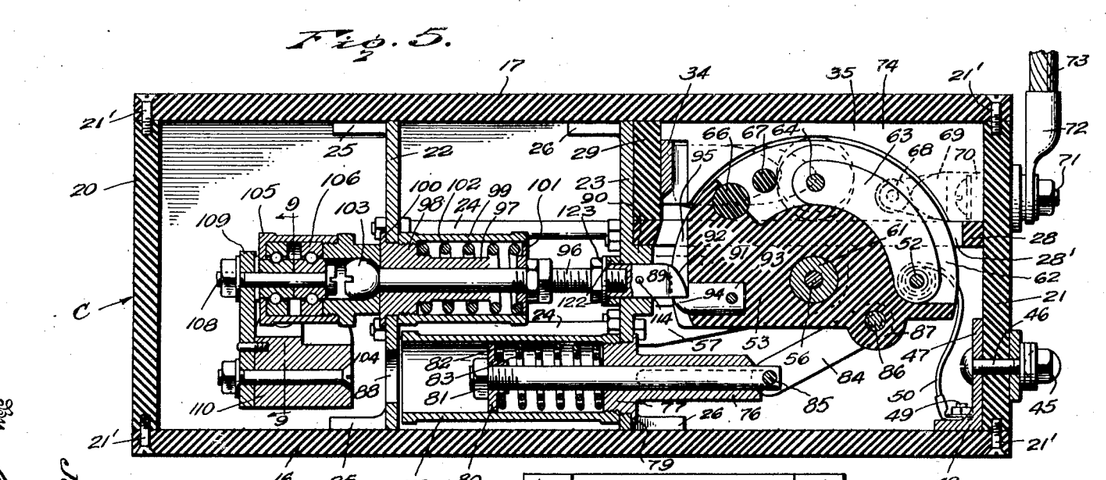
Figure 5 is a sectional view taken longitudinally through the device along the line 5—5 of Figure 3.
Figures 6, 7, 8:
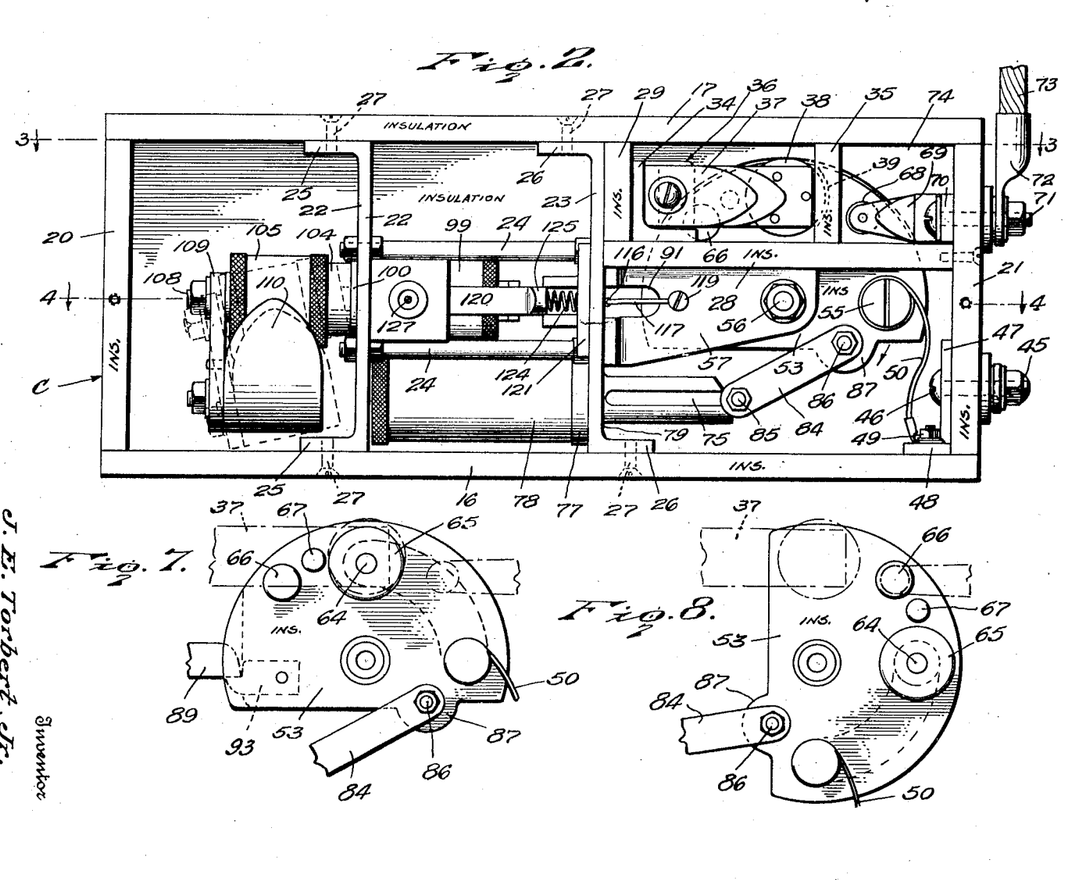
Figure 6 is a sectional view taken transversely through the device along the line 6—6 of Figure 4.
Figure 7 is a fragmentary view showing the switch portion of the device in the set position.
Figure 8 is a view similar to Figure 7 showing the position of the switch portion after it has been released.
Figure 6:
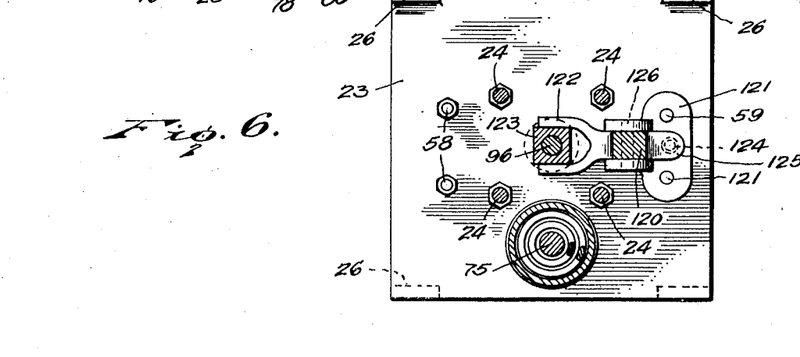
Figure 10:
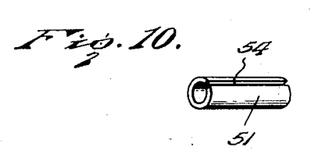
Figure 10 is a perspective view of a bushing constituting an element of the device.

The block of insulation 53 is to be releasably held in the position shown in Figure 5 and when released swung about the pivot shaft 56 to a position in which the battery circuit will be broken and the magneto short circuited. In order to impart the swinging movement to the block 53 when it is released, there has been provided a plunger 75 which is slidably mounted for longitudinal movement through the sleeve or neck 76 carried by the head 77 of a cylinder 78. This cylinder extends longitudinally of the casing or housing between the plates 22 and 23 and the head 77 is formed with a flange 79 by engaging the plate 23 and causing the cylinder to be firmly mounted when it is screwed upon the head, as shown in Figure 5. An abutment disc 80 is held upon the plunger by a nut 81 and fits snugly in the cylinder so that it may have movement in the cylinder corresponding to that of the piston and guide sliding movement of the plunger. A spring 82 and an inner spring 83 fit about the plunger between the abutment disc 80 and the inner end of the head 77, and upon referring to Figure 5 it will be seen that when the plunger is drawn outwardly by the links 84 which connect the cross head or pin 85 of the plunger with the pin or bolt 86 which passes through the extension 87 of the block 53, the two springs will be compressed and thus their tension increased so that when the block 53 is released and moves from the position shown in Figures 5 and 7 to that shown in Figure 8, this movement of the block will be effected by expansion of the springs. The springs quickly expand when the block is released and pull exerted upon the block by the plunger and the links will cause it to be moved rapidly from the position of Figure 7 to that of Figure 8. This not only insures quick breaking of the ignition circuit from the battery and short circuiting of the magneto but also prevents any likelihood of the block catching and failing to move to its proper position. The inner end of the cylinder is disposed about an opening 88 formed in the plate 22, thus permitting air to pass freely into or out of the cylinder and prevent formation of an air cushion which would retard movement of the plunger and the disc or piston 80 towards the inner end of the cylinder.

In order to releasably hold the block 53 in the set position shown in Figure 5, there has been provided a latch or dog 89 which is slidable through a boss 90 projecting from the plate 23. This boss carries arms 91 overlapping opposite side faces of the block 53 to guide movement of the block about the shaft 56 and the upper face of the latch is beveled, as shown at 92, so that when the block 53 is swung from the position shown in Figure 8 to that shown in Figures 5 and 7, the keeper 93 embedded in the block with its tooth 94 extending into the groove 95 formed in the arcuate edge face of the block may move downwardly past the latch or dog to a position below the dog where it will engage the under face of the dog and thus cause the block to be held in the set position until the dog or latch is shifted away from the block. The dog or latch is threaded upon the threaded end portion of a rod or plunger 96 which extends longitudinally of the housing or casing between the plates 22 and 23 and is slidably supported through a sleeve 97 extending from the head 98 of a cylinder 99. The cylinder is threaded upon the head 98 and when it is screwed tightly upon the head, the plate 22 will be firmly gripped between the cylinder and the flange 100 of the head. An abutment disc 101 is carried by the plunger 96 and is of such diameter that it may slide easily in the cylinder. This abutment disc engages one end of a spring 102 which fits about the sleeve 97 within the cylinder with its other end bearing against the head 98 and yieldably resists movement of the plunger in a direction to shift the dog out of the operative position in which it may have engagement with the tooth of the keeper 91. It will thus be seen that when the block 53 is in the set position it will be securely held in this position until the plunger 96 is subjected to pulling action.

Figure 4:
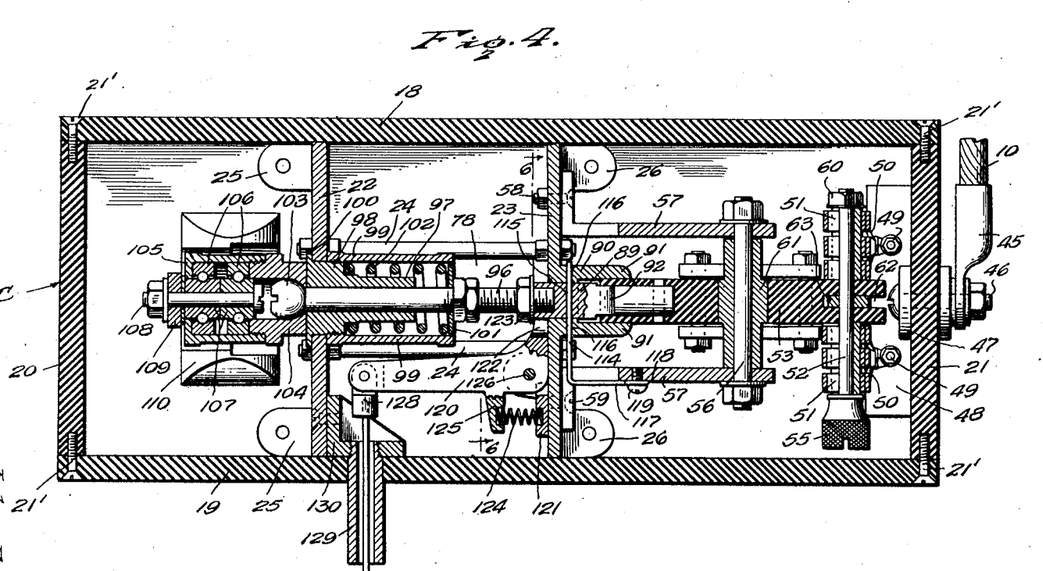
Figure 4 is a sectional view taken longitudinally through the device along the line 4—4 of Fig. 2.

The means by which pull is exerted upon the plunger is carried by the vehicle head 103 formed at the end of the plunger which projects from the cylinder head 98 into the space between the plate 22 and the end wall 20 of the casing. This head fits within a socket 104 upon which a bearing cup 105 is screwed, thus providing a ball and socket joint between the bearing cup and the plunger and permitting the bearing cup and the socket to be tilted about the vehicle head or ball 103 and constitutes a lever handle which fulcrums against the outer face of the head 98, as indicated by dotted lines in Figure 2. Ball bearings 106 are mounted in the bearing cup 105 and each has its inner race 107 formed with a central bore through which extends a bolt 108 which projects beyond the head of the cup and through an opening formed in an arm 109 carried by a weight 110. The weight is crescent shaped, as shown clearly in Figure 9, and as the arm 109 is loose upon the bolt 108, the weight 110 may swing about the bolt and always remain in depending relation to the bolt and the bearing cup regardless of the angular position of the airplane. Shoes 111 which are slidably mounted in sockets 112 formed in the weight are urged outwardly by springs 113 to engage the peripheral face of the bearing cup and prevent the weight from having too free swinging movement. The bearing cup, the bolt 108 and the socket 104 normally extend in axial alinement with the plunger 96 but when an airplane strikes the ground with sufficient force to create a jolt, the weight will have a tendency to swing towards the partition 22 due to forward momentum and they will be moved to the position indicated by dotted lines in Figure 2 and thus exert pull upon the plunger 96 to draw the dog 89 rearwardly and out of engagement with the tooth 94 of the keeper 91. The block 53 will thus be released and pull exerted by the springs 82 and 83 upon the plunger 75 will cause the block to turn to the position shown in Figure 8 to break the battery circuit and short circuit the magneto. It is desired to only have the latch or dog move out of engagement with the keeper when there is a severe jolt caused by an airplane crashing as otherwise jolts of moderate intensity caused by ordinary landing of an airplane would effect releasing of the block 53. Therefore, there has been provided a shear pin 114 which is passed through openings 115 and 116 formed in the dog and in the boss 90 of the plate 23. This shear pin is bent intermediate its length to provide a portion extending laterally, as shown in Figure 4, and terminating in an eye 118 to fit about a screw 119 carried by one of the brackets 57. The shear pin will thus be securely held in place and will prevent slight jolts from moving the dog or latch 89 in a releasing direction, where as a severe jolt caused by an airplane striking the ground with great force during a crash will cause the pin to be severed by a shearing action and the dog or latch moved to a position in which the block 53 will be released and permitted to move out of the set position.

In some instances, the aviator may wish to manually release the block and break the battery circuit and short circuit the magneto. This would be particularly desirable in case the aviator noticed that he was approaching a dangerous landing and wished to be sure that the ignition would be cut off and the magneto short circuited. Therefore, there has been provided a lever 120 which is pivotally mounted between the ears of a bracket 121 carried by the plate 23 and secured thereon by the screws 59. Forks 122 extend from the lever to straddle the dog 89 between the plate 23 and the nut and washer 123 by means of which the dog or latch is firmly locked upon the plunger. A spring 124 which has one end bearing against the bracket 121 and its other end engaging an arm 125 projecting from the lever 120, normally holds the lever in the position shown clearly in Figure 4 and in Figure 3, but when pull is exerted upon the lever to tilt the lever about its pivot 126, the forks will be moved to exert pressure against the nut and washer and the dog and plunger will be shifted rearwardly to a position in which the block 53 will be released. A pull wire 127 has one end connected with the lever by a coupling 128 which is pivoted to the lever and this wire extends outwardly through a sleeve 129 carried by a bracket 130 secured to the plate 22. This pull wire may be of any length desired and suitably guided to a convenient point in the cock pit where it may be easily grasped by the aviator and pulled when it appears that a dangerous landing will be made. It will thus be seen that the device will be manually controlled as well as automatic in its operation.

Figures 11, 12:
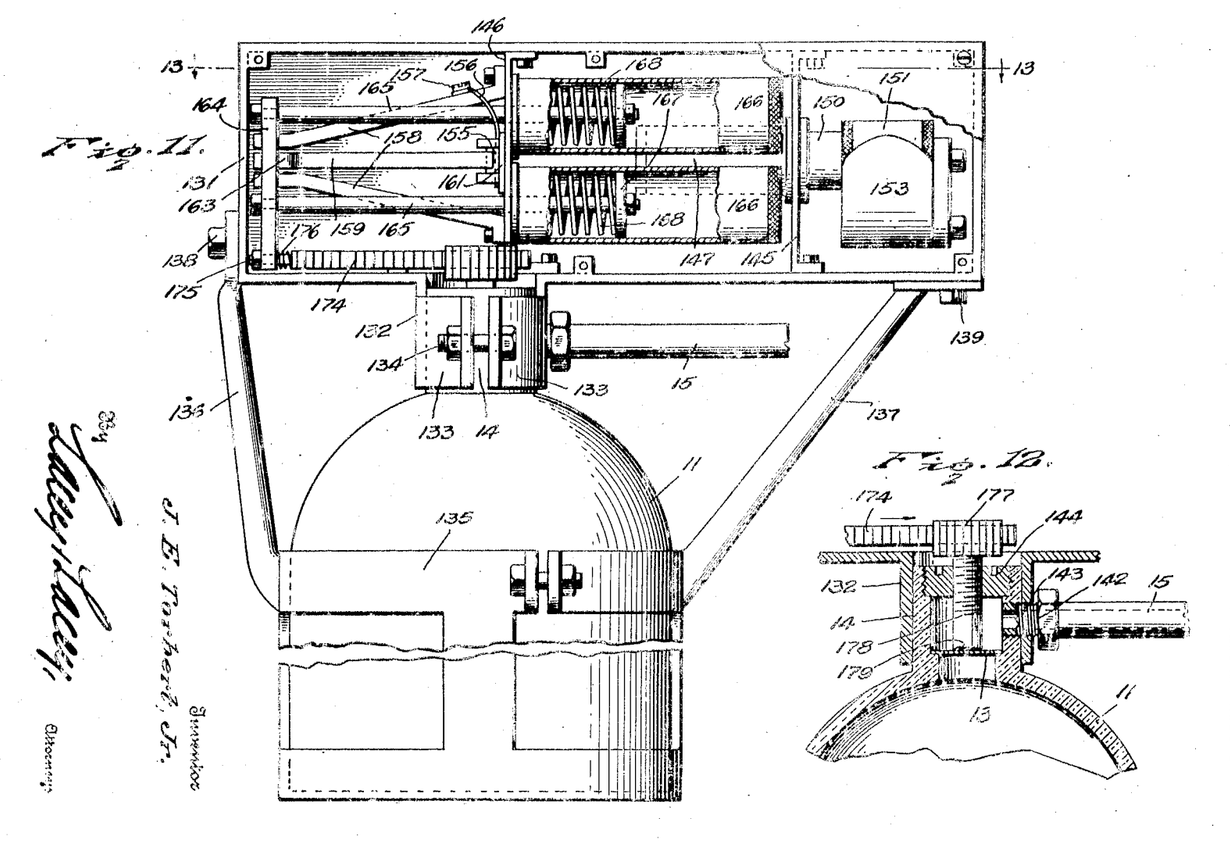
Figure 11 is a view in elevation of the embodiment of the invention wherein fire extinguishing gas is to be released from a container after a crash landing.
Figure 12 is a fragmentary view taken longitudinally of the neck portion of the gas container and illustrating the manner in which an outlet for gas is formed after a crash landing.

The embodiment of the invention by means of which a fire extinguishing gas is released is illustrated in Figures 11 through 16. When this embodiment of the invention is in use, the housing or casing 131 is to be mounted upon the container 11 in which the fire extinguishing gas is stored. In order to do so, the bottom wall of the housing is formed with a depending neck 132 which fits about the neck 14 of the container and has jaws 133 terminating in ears through which a bolt 134 passes in order that the neck or sleeve 132 may be drawn tightly about the neck of the container. A metal jacket 135 fits about the container and at its upper end is provided with arms 136 and 137, the arm 136 being secured against an end wall of the casing by a bolt 138 and the arm 137 being secured against the bottom wall of the casing by a bolt 139. Upon referring to Figure 13 it will be seen that the neck or sleeve 132 projects from the side wall 140 of the casing. This portion of the sleeve or neck is covered by a cap or hood 141 carried by and projecting from the side wall 140. Therefore, the neck of the container will be entirely enclosed by the sleeve 132 and the hood 141 and the mechanism by means of which the sealing disc 13 is to be punctured will also be shielded. The distributer pipe 15 through which the fire extinguishing gas passes when released is provided with a coupling 142 at one end having a threaded nipple 143 which is screwed through alined openings formed in the container neck 14 and the neck or sleeve 132, as shown in Figure 12. These openings are below the closure plug 144 which is screwed into the container neck and from an inspection of Figure 12 it will be readily seen that when the partition or sealing disc is perforated, the gas will flow through the pipe 15.

The mechanism housed within the casing 131 in many respects corresponds to the mechanism housed in the casing C. Therefore, certain elements will be only briefly referred to in describing this embodiment of the invention. Plates corresponding to the plates 22 and 23 are mounted in the casing in spaced relation to each other longitudinally thereof and the plate 145 carries a cylinder 147 corresponding to the cylinder 99. Through this cylinder extends a plunger 148 corresponding to the plunger 96 and within the cylinder is mounted a spring 149 which yieldably resists movement of the plunger away from the plate 46. A socket 150 corresponding to the socket 104 is carried by the plunger 148 beyond the plate 145 and this socket carries a bearing cup 151 which houses bearings corresponding to those shown in Figure 4. There has also been provided a bolt or stem 152 corresponding to the bolt 108 and from which a weight 153 is suspended by its arm 154. It will thus be seen that the plunger 148 may be shifted longitudinally when a crash occurs and the latch 155 at the front end of the plunger shifted rearwardly through the plate 146 when the shear pin 156 is severed. The shear pin is secured by a screw 157 to one of the brackets 158 which are carried by the plate 146 and project therefrom towards the forward end of the casing. These brackets terminate adjacent the end wall of the casing, and upon referring to Figure 11 it will be seen that they converge towards this end wall but terminate in parallel end portions. Between these parallel end portions of the brackets an arm 159 is pivotally mounted by a pin 160. The arm is of such length that its free rear end portion may be swung downwardly between the arms of the bracket 161 through which the shear pin extends and as the free end of this arm is beveled, as shown at 162, it may be forced downwardly past the latch 155 which will be immediately returned to a position for overlapping the free end of the arm by the spring 149 and releasably hold the latch in a set position. It will, of course, be understood that the shear pin is not applied until the arm has been secured in the set position. A lug or dog 163 extends from the arm 159 near its pivoted end and is intended to engage a cross head 164 carried by plungers 165. These plungers correspond to the plunger 75 but two are used instead of one plunger. The plungers extend through the plate 146 into the cylinders 166 and carry abutment discs 167 engaged by springs 168 so that when the latch 155 is moved out of securing engagement with the arm 159, the plungers will be quickly shifted longitudinally and carry the cross head 164 with them. Shifting of the latch 155 out of engagement with the free end of the arm may be effected automatically by movement of the weight and the socket 150 if an airplane crashes, or it may be manually effected in case of fire during flight by the aviator exerting pull upon the wire 167 which corresponds to the wire 127 and extends into the casing through the sleeve 168 with its inner end connected with a lever 169. This lever 169 corresponds to the lever 120 and is pivotally mounted by a bracket 170 with forks 171 of the lever straddling the latch in position to engage the abutment washer 172. From an ispection of Figure 13 it will be readily seen that when pull is exerted upon the wire to swing the lever 169 about its pivot 173, the forks will engage the abutment washer 172 and move the latch 155 out of overlapping engagement with the free end of the arm 159. A rack bar 174 extends longitudinally of the casing through the plate 146 and at its other end is reduced to form a stem 175 passing through an opening formed near one end of the cross head 164. A light spring 176 is coiled about the stem between the rack bar and the cross head and, therefore, a slight lost motion will be permitted between the cross head and the rack bar. The rack bar meshes with a gear pinion 177 carried by a threaded stem 178 which is engaged through the plug 144 and at its inner end is formed with cutting teeth 179 normally close to but out of cutting engagement with the sealing disc 13. When the arm is released and the spring 168 shifts the plunger and the cross head rearwardly in the casing, the rack bar will be moved longitudinally to rotate the stem 178 and thus cause the teeth to cut through the sealing disc and release the gas which will immediately flow through the pipe 15 and be delivered at points where fire is liable to break out. It will thus be seen that in case the airplane should in some way catch fire, the gas will be delivered at the danger points and the fire extinguished.

Figures 13, 14, 15, 16:
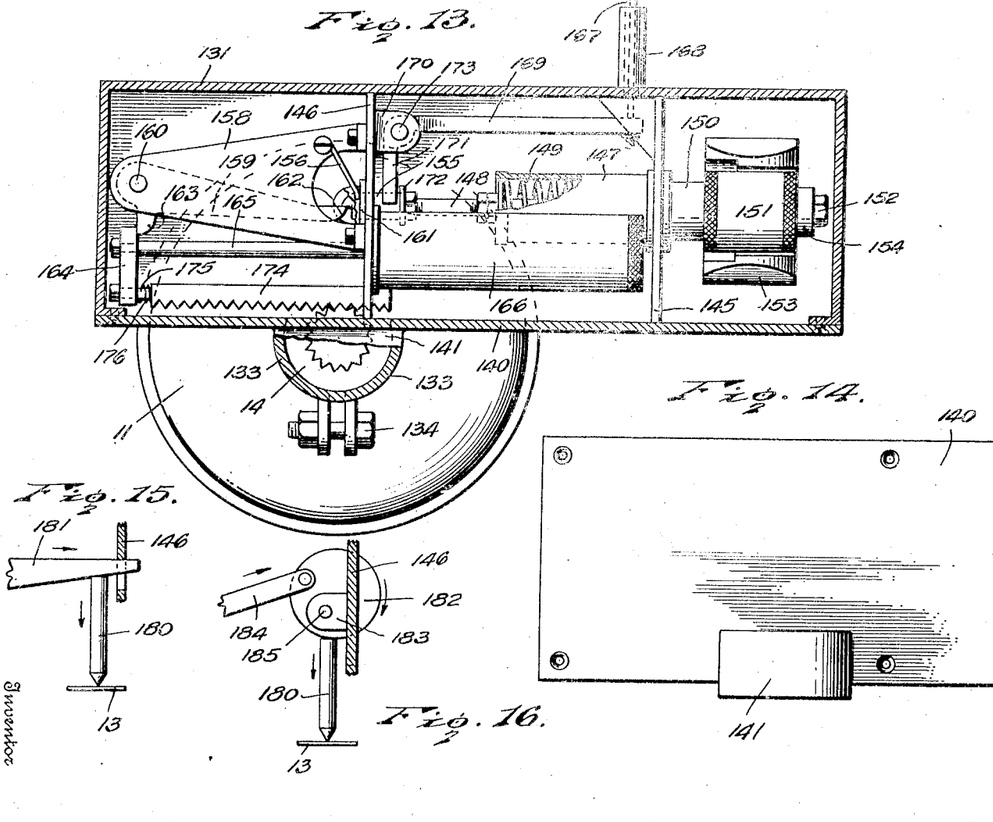
Figure 13 is a sectional view taken along the line 13—13 of Figure 11.
Figure 14 is a view of a portion of the wall shown in place in Figure 13 and omitted in Figure 11.
Figure 15 is a fragmentary semi-diagrammatic view of a modified form of member for forming an opening in the sealing disc of the gas container.
Figure 16 is a view similar to Figure 15 illustrating a modified form of cam for imparting movement to a plunger by means of which the outlet opening for the gas is formed.

Instead of providing a threaded cutter 178 there may be provided a punch 180 which is slidable through the plug 144. This punch extends into the casing and has its end engaged by a cam bar or strip 181 which takes the place of the rack bar 174 and is secured at one end to the cross head in the same manner in which the rack bar is connected thereto. The sloping edge face of the cam bar or strip bears against the plunger or punch and when this bar or strip is shifted longitudinally towards the right in Figure 15, the plunger will be forced through the plug 144 to puncture the sealing disc. In Figure 16 there has been shown another modified construction wherein the punch 180 instead of engaging a cam bar or strip 181 bears against the peripheral edge face of a disc 182. This disc or cam 182 is eccentrically mounted between bearing ears 183 projecting from and carried by the plate 146 and a link or pitman 184 connects the cam disc with the cross head 164. Movement of the link or pitman in the direction indicated by the arrow in Figure 16 will turn the cam disc about its eccentric pivot 185 and thus swing it downwardly relative to the bearing bracket and apply pressure to the punch which will force the punch through the sealing disc and release the gas.

Having thus described the invention, what is claimed as new is:

1. In a safety apparatus for vehicles, an element movable into and out of a set position, a latch for releasably securing said element in a set position, and means for moving the latch into position to release said element having an actuating weight mounted for universal swinging movement and moved by momentum in a direction to shift the latch to the releasing position when a vehicle is suddenly stopped by colliding with an obstruction.

2. In a safety apparatus for vehicles, an element movable into and out of a set position, a latch for releasably securing said element in a set position having a shank slidable longitudinally, and means for shifting the shank longitudinally in a direction to move the latch to a releasing position including a member connected with the shank for universal tilting movement about the shank, and a weight carried by said member and mounted for swinging movement about the axis of the shank and said member.

3. In a safety apparatus for vehicles, a frame having spaced plates, an element mounted for movement into and out of a set position, a latch carried by one plate and movable into and out of position to engage said element and releasably secure the element in a set position, means for imparting movement to said element when released, a shank for said latch slidable longitudinally through the second plate, means yieldably resisting movement of the shank in a direction to move the latch to a releasing position, and means for moving said shank in a direction to move the latch to a releasing position adapted to be actuated by momentum when a moving vehicle is suddenly stopped by colliding with an obstruction.

4. In a safety apparatus for vehicles, a frame having spaced plates, an element mounted for movement into and out of a set position, a latch carried by one plate and movable into and out of position to engage said element and releasably secure the element in a set position, means for imparting movement to said element when released, a shank for said latch slidable longitudinally through the second plate, means yieldably resisting movement of the shank in a direction to move the latch to a releasing position, a socket connected with the outer end of said shank for universal movement and bearing against the second plate, and a weight mounted for swinging movement about the socket axially of the shank and spaced from the second plate whereby the weight may at all times be suspended from the socket and be swung towards the said plate to tilt the socket and draw the shank longitudinally to move the latch to a releasing position when a moving vehicle is suddenly stopped by colliding with an obstruction.

5. In a safety apparatus for vehicles, a frame having spaced plates, an operating element mounted for movement into and out of a set position, a latch slidable through one plate into and out of position to secure the operating element when set, a shank for said latch slidable through the second plate and formed with a spherical head at its free outer end, means yieldably resisting movement of the shank and latch in a releasing direction, a socket mouned about the head for universal movement, a bearing cup carried by said socket, anti-friction means in said cup, a stem supported by the anti-friction means and extending in alinement with said shank, a weight under said cup, an arm suspending said weight from said stem, the weight being movable about the cup circumferentially thereof to a suspended position and being spaced from the second plate whereby the force of momentum may shift the weight towards the plate and tilt the cup and socket against the second plate to exert pull upon the shank and move the latch into position for releasing the operating element when a vehicle is suddenly stopped by collision with an obstruction, and means for imparting movement to the operating element when released.

6. In a safety apparatus for vehicles, a frame having spaced plates, an operating element movable into and out of a set position, a cylinder carried by one plate, a plunger slidable longitudinally in said cylinder and connected with said operating element, a spring in said cylinder for acting upon said plunger and moving said operating element out of a set position, a latch for releasably securing the operating element in a set position slidable through said plate, a shank for said latch slidable through the second plate and yieldably held against movement in a direction to move the latch to a releasing position, and means for shifting the shank in a direction to move the latch to a releasing position mounted for swinging and universal tilting movement about the shank and actuated by momentum to exert pull upon the shank when a vehicle is suddenly stopped by striking an obstruction.

7. In a safety apparatus for vehicles, a frame having spaced plates, an operating element movable into and out of a set position, a cylinder carried by one plate, a plunger slidable longitudinally in said cylinder and connected with said operating element, a spring for acting upon said plunger and moving said operating element out of a set position, a latch for releasably securing the operating element in a set position slidable through said plate, a shank for said latch extending through the second plate, a guide for said shank carried by the second plate, a cylinder carried by said guide, an abutment carried by said shank within the cylinder, a spring about the guide within the cylinder engaging the abutment and yieldably resisting movement of the shank in a direction to shift the latch to a releasing position, and actuating means for the shank carried by the free end thereof and adapted to be actuated by momentum when a vehicle is suddenly stopped by striking an obstruction.

8. In a safety device for vehicles, a casing, a frame in said casing having end plates spaced from each other longitudinally of the casing and spaced from end walls of the casing, an operating element mounted between one plate and one end wall of the casing and movable into and out of a set position, a latch for releasably holding said operating element in a set position movably carried by said plate and having a shank slidable through the other plate, means for moving the operating element out of the set position when the latch is moved to a releasing position, means carried by said shank for automatically imparting longitudinal movement to the shank and moving the latch to a releasing position when a vehicle is suddenly stopped by colliding with an obstruction, and manually operated means for moving the latch to the releasing position.

9. In a device of the character described, a casing, a frame in said casing, an operating element movable into and out of a set position, a latch carried by said frame and yieldably held in position for securing the operating element in the set position, means for imparting movement to the operating element when released, jolt operated means mounted for universal movement and adapted to move the latch to a releasing position, and manually operated means for moving the latch to a releasing position independent of the jolt-operated means.

10. In a safety device for vehicles, a casing, a frame in said casing spaced from ends thereof, a mounting extending from said frame towards one end of said casing, an insulating block pivotally carried by said mounting, a conductor strip carried by said block, a pin extending through said block and one end of said strip, a second pin extending through said block beyond the said end of said strip, a bracket carried by said casing and adapted to have a circuit wire connected therewith, a conductor connecting said bracket with the other end of the conductor strip, an insulated bracket carried by said frame and adapted to have a circuit wire connected therewith, resilient terminal members carried by the second bracket and straddling said block for engaging the first pin when the block is in a set position and completing a circuit through the circuit wires, other brackets carried by said casing and adapted to have magneto wires connected thereto, resilient terminal members carried by the last-mentioned brackets in position for engagement by the second pin to short circuit the magneto when the block moves out of the set position, means for releasably securing the block in a set position, means for moving the last mentioned means to a releasing position, and means for moving the block when released.

11. In a safety device for vehicles, a casing, a frame in said casing, a mounting carried by said frame, an insulating block pivotally carried by said mounting for movement into and out of a set position, a latch for releasably securing the block in a set position, means for moving said latch to a releasing position, means for moving the block out of the set position when released, a conductor strip carried by said block, a terminal pin extending through said block and engaging one end of said strip, a bridging pin carried by said block, a terminal for a circuit wire carried by said casing and connected with the other end of said strip, a terminal for a companion circuit wire carried by said frame and having contact members for engaging the terminal pin to complete a circuit when the block is in the set position, and terminals for magneto wires having contact members for engaging the bridging pin to short circuit a magneto when the block is released and moves out of the set position.

12. In a safety device for vehicles, a casing, a frame in said casing, a mounting carried by said frame, an insulating block pivotally carried by said mounting for movement into and out of a set position, a latch for releasably securing the block in a set position, means for moving said latch to a releasing position, means for moving the block out of the set position when released, spaced terminals adapted to have circuit wires connected therewith, means carried by said block for completing a circuit between the terminals when the block is set, spaced terminals for magneto wires, and means for bridging the last-mentioned terminals and short circuiting the magneto when the block is moved out of the set position.

13. In a safety device for vehicles, a casing, a frame in said casing, a mounting carried by said frame, a cylinder carried by said frame, a piston slidable in said cylinder and yieldably held against outward movement, a rod for said piston projecting from said cylinder, a cross head at the outer end of the piston rod, an arm pivoted to said mounting and having a tooth for engaging the cross head and securing the piston rod in a set position, a latch carried by said frame and yieldably held in position to engage the arm and secure the arm in position to hold the piston rod extended, means for moving the latch to a releasing position, a rack bar carried by said cross head, and threaded means for puncturing a seal for a container having an end portion extending into the casing and provided with a pinion engaged by the rack bar whereby the puncturing means will be rotated and moved in a puncturing direction by longitudinal movement of the rack bar.

14. In a safety device for vehicles, a casing, a frame in said casing, a mounting carried by said frame, a cylinder carried by said frame, a piston slidable in said cylinder and yieldably held against outward movement, a rod for said piston projecting from said cylinder, a cross head at the outer end of the piston rod, an arm pivoted to said mounting and having a tooth for engaging the cross head and securing the piston rod in a set position, a latch carried by said frame and yieldably held in position to engage the arm and secure the arm in position to hold the piston rod extended, means for moving the latch to a releasing position, a rack bar carried by said cross head, means for puncturing a seal of a container, and actuating means for the puncturing means carried by the cross head.

15. In a safety device for vehicles, a casing, a frame in said casing, a mounting carried by said frame, a cylinder carried by said frame, a piston slidable in said cylinder and yieldably held against outward movement, a rod for said piston projecting from said cylinder, a cross head at the outer end of the piston rod, an arm pivoted to said mounting and having a tooth for engaging the cross head and securing the piston rod in a set position, a latch carried by said frame and yieldably held in position to engage the arm and secure the arm in position to hold the piston rod extended, means for moving the latch to a releasing position, a rack bar carried by said cross head, means for puncturing a seal of a container, and actuating means for the puncturing means consisting of a cam bar extending from the cross head and engaging the puncturing means.

16. In a safety device for vehicles, a casing, a frame in said casing, a mounting carried by said frame, a cylinder carried by said frame, a piston slidable in said cylinder and yieldably held against outward movement, a rod for said piston projecting from said cylinder, a cross head at the outer end of the piston rod, an arm pivoted to said mounting and having a tooth for engaging the cross head and securing the piston rod in a set position, a latch carried by said frame and yieldably held in position to engage the arm and secure the arm in position to hold the piston rod extended, means for moving the latch to a releasing position, a rack bar carried by said cross head, means for puncturing a seal of a container, and actuating means for the puncturing means consisting of a cam disc carried by said frame and engaging the puncturing means, and a link for connecting the cam disc with the cross head and turning the disc.

17. In a safety apparatus for vehicles, an element mounted for movement into and out of a set position, a latch for releasably securing said element in a set position, and means for moving said latch out of position to secure said element, said means mounted for swinging and universal tilting movement about the latch and moved in a direction to move the latch to a releasing position by a jolt caused by sudden stopping of a moving vehicle.

18. In a safety apparatus for vehicles, an element movable into and out of a set position, a latch shiftable into and out of position for releasably securing said element in a set position and being yieldably held in the securing position, and means for moving the latch into position to release said element, said means mounted for swinging movement about the longitudinal axis of the latch and tilted by momentum to move the latch out of the securing position when a moving vehicle is suddenly stopped by collision with an obstruction.

JOHN E. TORBERT, Jr.